(No Model.)
B. A. WELDS.
FENCE MAKING MACHINE.
No. 352,212. Patented Nov. 9, 1886.
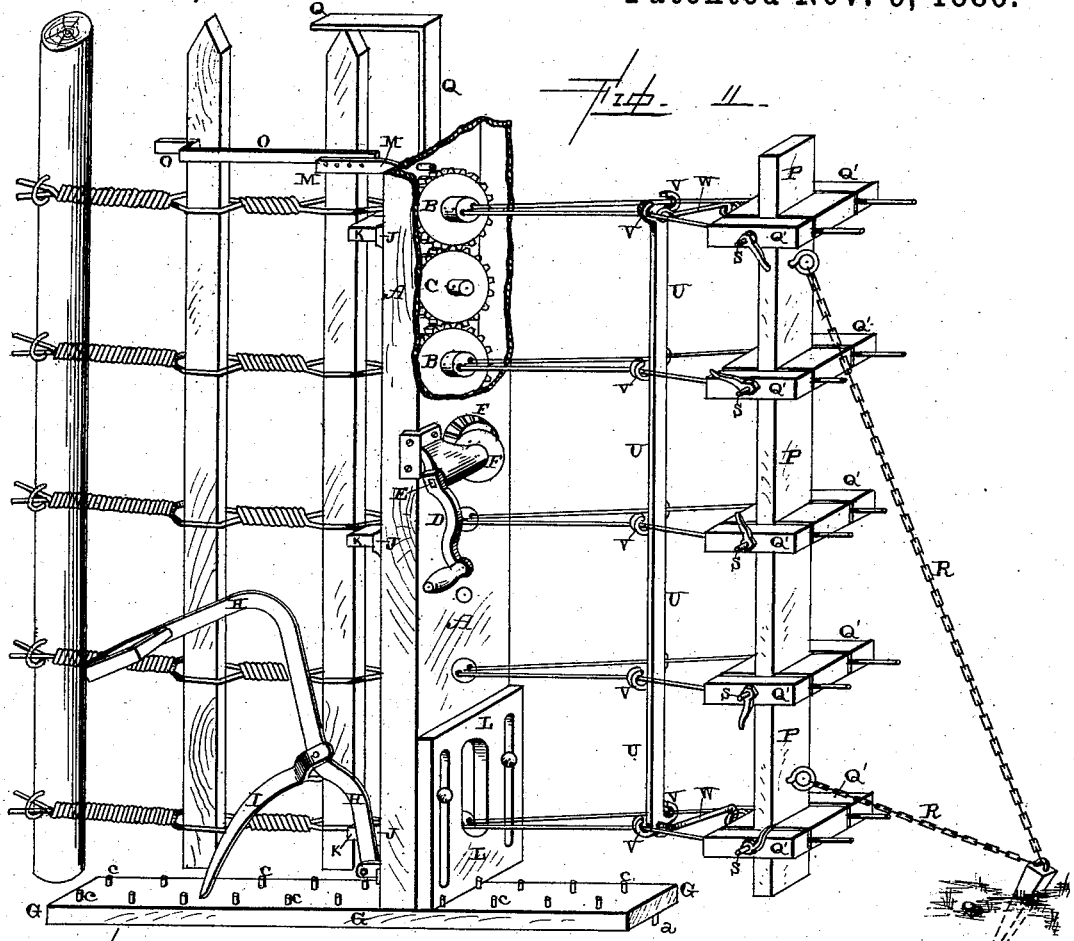
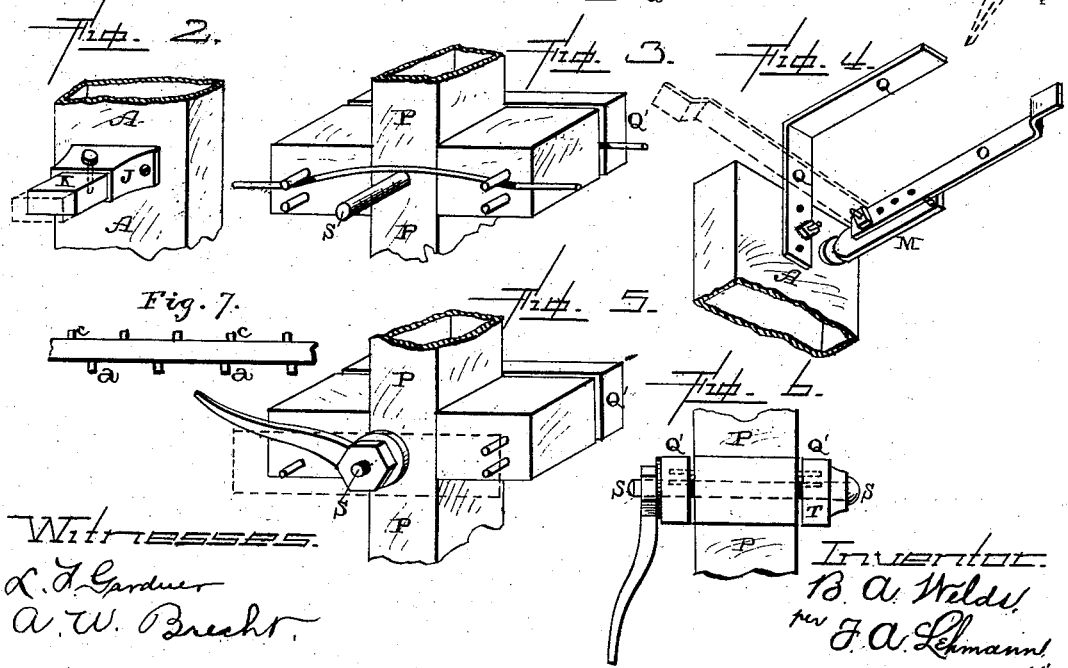
Witnesses.
L. F. Gardner
A. W. Brecht
Inventor.
B. A. Welds
per F. A. Lehmann
atty
N. PETERS, Photo-Lithographer, Washington, D. C.

UNITED STATES PATENT OFFICE.

BENJAMIN A. WELDS, OF JACKSON, MICHIGAN.

FENCE-MAKING MACHINE.

SPECIFICATION forming part of Letters Patent No. 352,212, dated November 9, 1886.

Application filed August 17, 1886. Serial No. 211,150. (No model.)

*To all whom it may concern:*

Be it known that I, BENJAMIN A. WELDS, of Jackson, in the county of Jackson and State of Michigan, have invented certain new and useful Improvements in Fence-Making Machines; and I do hereby declare the following to be a full, clear, and exact description of the invention, such as will enable others skilled in the art to which it pertains to make and use it, reference being had to the accompanying drawings, which form part of this specification.

My invention relates to an improvement in fence-making machines; and it consists in, first, the combination of the frame with the board upon which it rests, and which is provided with pins or projections upon both sides, the pins being placed a greater distance apart on one side than the other; second, an iron rod having a series of hooks connected thereto, and which is used in connection with the tension mechanism for the purpose of both guiding the wires and giving the wires a bend just beyond the tension-holder, all of which will be more fully described hereinafter.

Figure 1 is a perspective of a machine, showing my invention complete. Figs. 2, 3, 4, 5, 6, and 7 are detail views of the different parts.

A represents the frame of the machine, which will be of any desired height, and inside of which are journaled a suitable number of twisting-wheels, B, which are connected together by means of idle-wheels C. When the crank D is applied to the shaft E, the two beveled wheels F cause all of the twisting and idle wheels to revolve together. The wires are used in pairs, and are passed through openings made through the twisting-wheels in the usual manner, so that when the wheels are made to revolve the wires are twisted together, as shown.

The base G, upon which the machine is placed while in use, is provided with a double row of studs, pins, or projections, c, upon its upper side, for the purpose of holding the lower end of the machine in position, and upon its under side with a single row of projections, a, which may be placed farther apart or nearer together than the double row upon the top. When the projections upon the top of the base do not give the required distance that the lower end of the machine is to be moved each time that a picket is to be inserted between the wires, the base is reversed and the projections upon the under side are brought into play. The projections upon the under side of the base serve to hold the base in position by catching in the ground, and thus prevent the base from moving while the machine is in use. Heretofore bases have been used having notches on one side only. Such bases have only one adjustment for the machine, and, having nothing to hold them in position upon the ground, will slide back and forth whenever a strain is brought to bear upon them.

For the purpose of moving the machine along upon the base as fast as each paling is inserted into position there is pivoted to the lower end of the machine the lever H, which has its outer free end bent downward, as shown, and adapted to be operated by the foot. Connected to this lever is an adjustable dog or pawl, I, which is sharp at its lower end, so as to catch against the base or ground, and thus serve in connection with the lever to lift the lower end of the machine up and move it forward. By having the end of the lever H turned downward, so as to be operated by the foot alone, both hands are left free for the purpose of moving the top of the machine and inserting pickets, thus enabling one man to operate the machine much more rapidly than can be done where the machine must be moved by hand.

Secured to one side of the frame A are a suitable number of sockets, J, into which the adjustable guides K are placed. These guides serve to regulate the distance of the pickets from the side of the machine, as shown in Fig. 1, by catching against the edge of the picket, and thus holding it in position while the wires are twisted around it. These guides are made removable, so that ones of different lengths can be used, according to the distance desired between the pickets.

In order to regulate the distance the lower wire shall be raised above the ground there is adjustably secured to the lower end of the frame A, on the opposite side from the lever H, a slotted plate, L. This plate can be adjusted vertically, and serves as a support for the frame when the lower end of the frame does not bear directly upon the base. This plate L can be adjusted vertically the length of the slots, and hence can be depressed below the lower end of the frame A, so as to form the only support upon which the frame will rest. In proportion as this plate L is forced downward, so the wires are raised upward above the ground.

In order to brace the upper end of the frame A and hold it in an upright position, there is pivoted to the perforated support M the brace O, having its outer free end bent so as to catch behind the edge of the last paling secured in position, as shown. The end of this rod catching behind the paling prevents the upper end of the machine from being forced forward, and thus causing the machine to do irregular and uneven work. When this brace is to be detached from the paling, the machine is pushed sidewise far enough at its upper end to allow it to become readily detached, and thus it can be used in connection with palings which extend any desired height at their upper ends above the upper wires. Heretofore a loop provided with a roller has been dropped over the top of the picket, and this loop can only be used in connection with pickets which have their ends projecting upward a certain height. If the end of the picket projects up but a very slight distance above a certain point, then this loop cannot be used, because it cannot be detached from the picket by simply raising it upward.

For the purpose of holding the upper ends of all of the pickets upon a certain level, there is adjustably secured to the frame A the gage Q. This gage consists of a piece of iron bent at a right angle, and which projects above the upper end of the frame A, and beyond its side just far enough over the picket which is being inserted into place. By means of a device of this kind the ends of the pickets are all secured upon the same level, and a much neater fence is produced.

The upright P, to which the tension-blocks Q' are fastened, is placed any desired distance beyond the machine A, and is anchored to the ground by means of chains R, which are fastened at their lower ends to a stake, which is driven into the ground, as shown in Fig. 1. These chains and the stake serve to hold this upright against all strain which is exerted upon the wires. The blocks Q' are fastened to the standard P by means of bolts S, which pass through the standard and the blocks, and which bolts are provided with rubber washers T at one end, and with a nut provided with a handle or lever at the other. The rubber washers serve to allow the blocks Q' a slight play, and thus prevent the wires from being held so tightly that they cannot slide between the block and the standard. Upon the inside of each of these blocks is made a series of recesses, so as to receive the projections or dowels which are formed upon and project from the standard, as shown in Figs. 3 and 5. The wires in passing between the blocks Q' and the uprights pass in between these dowel-pins and around the bolt, and are thus given a sufficient kink or bend in order to make them take a hold upon the wires. Used in connection with this tension mechanism is an iron rod, U, which is provided with a number of hooks or catches, V, which extend beyond its two edges. These hooks serve to catch the wires and hold them so that they will be drawn straight through the twisting-wheels in the frame A. This iron rod is provided with a perforation at each end, and is connected to the upright P by means of suitable wires, W, which hold it in position. As the wires pass from the tension-blocks Q they are bent toward each other, as shown in Fig. 1, so as to give them an additional kink or bend, and thus increase the tension upon the wires.

Having thus described my invention, I claim—

1. The base G, provided with pins or projections $a$ $c$ upon opposite sides, the pins on one side being placed farther apart than those on the opposite side, substantially as described.

2. The combination, with the tension mechanism, of suitable supporting-wires and a rod provided with a series of hooks for the wires to pass through, substantially as described.

In testimony whereof I affix my signature in presence of two witnesses.

BENJAMIN A. WELDS.

Witnesses:
A. S. PATTISON,
A. W. BRECHT.